(12) United States Patent
Barnett et al.

(10) Patent No.: US 8,524,028 B2
(45) Date of Patent: Sep. 3, 2013

(54) LAMINATE ASSEMBLY SEALING METHOD AND ARRANGEMENT

(75) Inventors: Robert G. Barnett, Windsor Locks, CT (US); Jorge E. Hidalgo, East Windsor, CT (US)

(73) Assignee: Hamilton Sundstrnad Space Systems International, Inc., Windsor Locks, CT (US)

( * ) Notice: Subject to any disclaimer, the term of this patent is extended or adjusted under 35 U.S.C. 154(b) by 241 days.

(21) Appl. No.: 12/546,765

(22) Filed: Aug. 25, 2009

(65) Prior Publication Data

US 2011/0048616 A1 Mar. 3, 2011

(51) Int. Cl.
*H01M 8/24* (2006.01)
*H01M 2/08* (2006.01)

(52) U.S. Cl.
USPC .......... 156/285; 156/156; 156/242; 429/469; 429/470; 429/511

(58) Field of Classification Search
USPC ............... 156/382, 156, 242, 285; 429/467, 429/468, 469, 470, 511, 508, 507
IPC ................................... C25B 9/18, 9/20
See application file for complete search history.

(56) References Cited

U.S. PATENT DOCUMENTS

| | | | |
|---|---|---|---|
| 2,012,046 A | 8/1935 | Jewett | |
| 2,143,793 A | 1/1939 | Nieberreither | |
| 3,378,406 A * | 4/1968 | Rosansky | 429/405 |
| 3,720,104 A * | 3/1973 | Zanker | 73/861.24 |
| 4,273,641 A | 6/1981 | Pere | |
| 4,677,863 A | 7/1987 | Gay et al. | |
| 4,973,531 A * | 11/1990 | Zaima et al. | 429/470 |
| 5,372,689 A | 12/1994 | Carlson et al. | |
| 5,419,980 A | 5/1995 | Okamoto et al. | |
| 5,547,777 A | 8/1996 | Richards | |
| 5,580,672 A | 12/1996 | Zagaja, III et al. | |
| 5,651,929 A | 7/1997 | Molter et al. | |
| 5,783,051 A | 7/1998 | Hirai et al. | |
| 5,942,350 A | 8/1999 | Roy et al. | |
| 5,993,987 A * | 11/1999 | Wozniczka et al. | 429/470 |
| 6,190,793 B1 * | 2/2001 | Barton et al. | 429/470 |
| 6,200,698 B1 * | 3/2001 | Carlstrom, Jr. | 429/465 |
| 6,258,475 B1 * | 7/2001 | Sugita et al. | 429/470 |
| 6,620,540 B2 | 9/2003 | Sugita et al. | |
| 6,703,154 B2 * | 3/2004 | Gorbell et al. | 429/465 |
| 6,787,262 B2 | 9/2004 | Wakahoi et al. | |
| 6,797,425 B2 * | 9/2004 | Blanchet | 429/470 |
| 6,811,913 B2 * | 11/2004 | Ruhl | 429/430 |

(Continued)

FOREIGN PATENT DOCUMENTS

| | | |
|---|---|---|
| JP | 2000294268 | 10/2000 |
| JP | 2001131787 | 5/2001 |
| JP | 2001135343 A | 5/2005 |

OTHER PUBLICATIONS

Partial European Search Report, dated Apr. 15, 2011, EP Application No. 10252226.5.

*Primary Examiner* — William Bell
(74) *Attorney, Agent, or Firm* — Carlson, Gaskey & Olds, P.C.

(57) ABSTRACT

An example method of sealing a laminate assembly includes preloading a laminate assembly having a plurality of laminations, pressurizing the laminate assembly, and pressurizing an enclosed volume disposed adjacent an end portion of the laminate assembly to hold the laminations in sealed positions.

24 Claims, 3 Drawing Sheets

(56) References Cited

U.S. PATENT DOCUMENTS

| | | |
|---|---|---|
| 2002/0110722 A1* | 8/2002 | Yang ............................... 429/37 |
| 2002/0142204 A1* | 10/2002 | Prediger et al. ................. 429/32 |
| 2003/0031915 A1* | 2/2003 | Diez et al. ...................... 429/38 |
| 2003/0235723 A1* | 12/2003 | Simpkins et al. ............... 429/13 |
| 2004/0265659 A1* | 12/2004 | Richardson et al. ............ 429/25 |
| 2008/0008917 A1 | 1/2008 | Homma |
| 2008/0090140 A1 | 4/2008 | Dalton et al. |
| 2008/0102345 A1* | 5/2008 | Andreas-Schott et al. ..... 429/37 |

* cited by examiner

LAMINATE ASSEMBLY SEALING METHOD AND ARRANGEMENT

STATEMENT REGARDING FEDERALLY SPONSORED RESEARCH OR DEVELOPMENT

This invention was made with government support under Contract No. N00173-01-D-2007 awarded by the Defense Advanced Research Projects Agency, which is an agency of the United States Department of Defense. The United States Government, therefore, may have certain rights in this invention.

BACKGROUND

Laminate assemblies having stacks of laminations are used in a variety of applications, such as fuel cell and electrolyzer applications. Sealing the interfaces between laminations of the laminate assembly desirably prevents overboard leakage of operating fluids from the laminate assembly and cross-cavity leakage of operating fluids from internal cavities established within the laminate assembly. Laminate assemblies utilize various seals to limit overboard and cross-cavity leakage. Example seals include elastomeric coating seals, gasket seals, or relying on the elastic nature of membrane laminations. Notably, these seals rely on an applied load pressurizing the seal to prevent leakage.

Many systems having laminate assemblies apply a preload to the laminate assembly using tie rods. Tightening the tie rods forces the laminations of the laminate assembly and associated seals into a sealed relationship with each other. The maximum amount of preload is limited by the compression capacity of the laminations. After the preload is applied, the internal cavities within the laminate assembly are pressurized. As known, the pressurizing can relax or otherwise disrupt the sealed relationship because the internal pressure forces the laminations against the direction of the preload. Disrupting the sealed relationship can undesirably result in leaks.

SUMMARY

An example method of sealing a laminate assembly includes preloading a laminate assembly having a plurality of laminations, pressurizing the laminate assembly, and pressurizing an enclosed volume disposed adjacent an end portion of the laminate assembly to hold the laminations in sealed positions.

An example laminate assembly pressurization arrangement includes a plurality of laminations arranged in a laminate stack. The plurality of laminations are movable between sealed positions and unsealed positions relative to each other. An end plate is adjacent the laminate stack. A housing is configured to establish a first volume together with the end plate. A first group of tie rods is directly secured to the end plate and is configured to move the end plate to a first position that holds the plurality of laminations in sealed positions. A second group of tie rods is directly secured to the housing. Pressurizing the first volume limits movement of the end plate away from the first position.

Another example laminate assembly pressurization arrangement includes a laminate assembly establishing a first enclosed volume. The laminate assembly has a plurality of laminations. An end plate is adjacent the laminate assembly. The end plate establishes a portion of a second volume. The end plate is configured to urge the laminations toward sealed positions relative to each other when the second enclosed volume is pressurized.

These and other features of the example disclosure can be best understood from the following specification and drawings, the following of which is a brief description:

DETAILED DESCRIPTION

Figure 1:
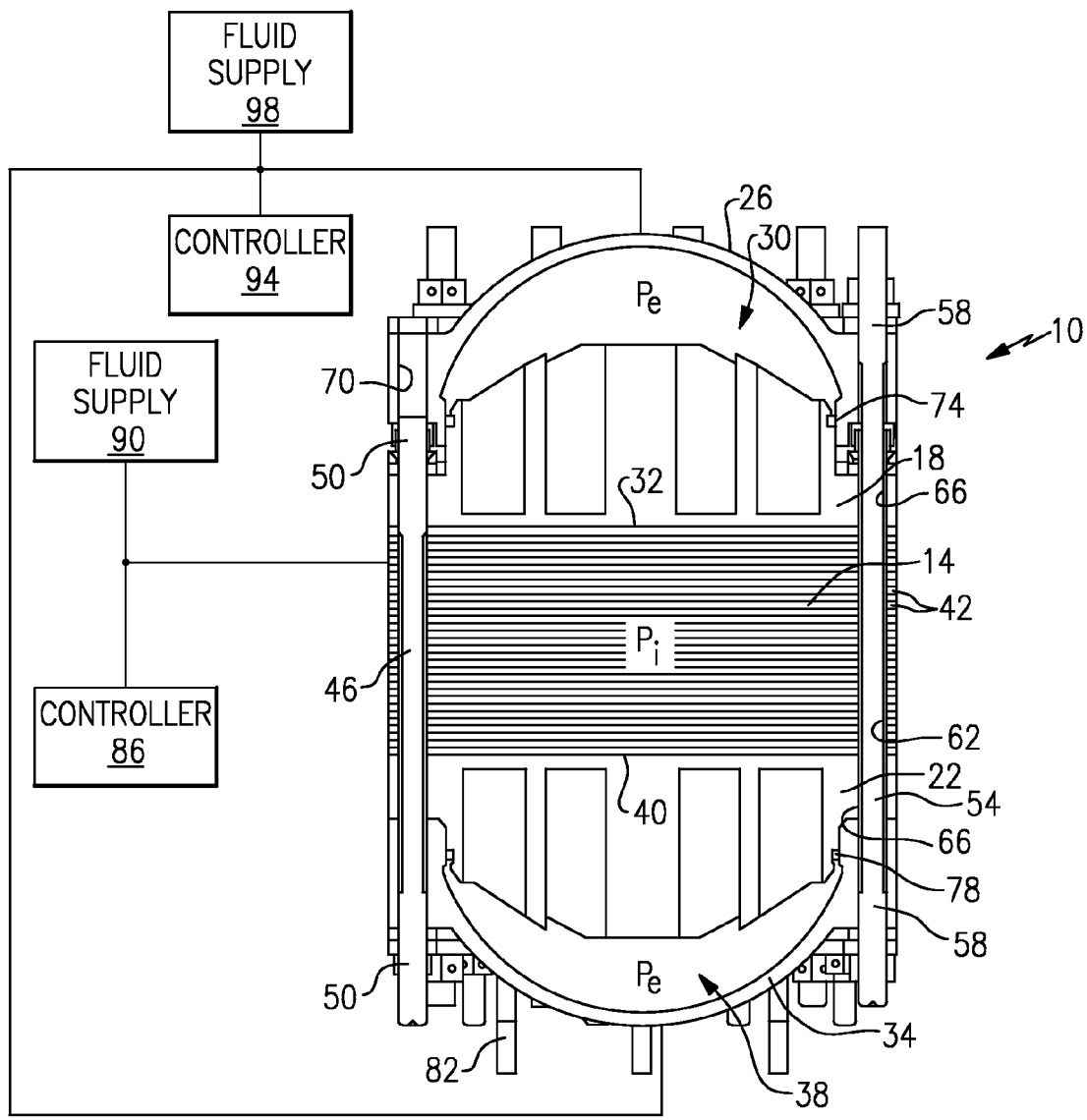
FIG. 1 shows a longitudinal cross-section through an example electrolyzer having a laminate assembly.
Figure 2:
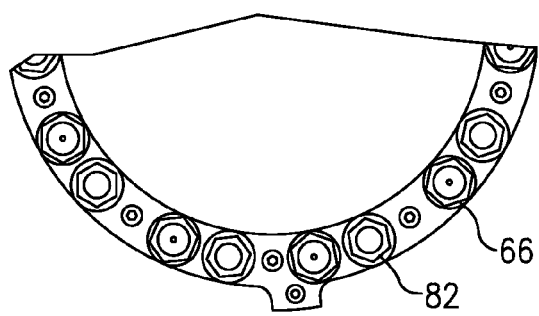
FIG. 2 shows a bottom view of the FIG. 1 electrolyzer.

Referring to FIGS. 1 and 2, an example electrolyzer 10 includes a laminate assembly 14 held between a first end plate 18 and a second end plate 22. A fuel cell includes the laminate assembly 14 in another example. One face of the first end plate 18 contacts the laminate assembly 14. An opposing face of the first end plate 18 establishes the first enclosed volume 30 together with the first housing 26. The first enclosed volume 30 is adjacent a first end portion 32 of the laminate assembly 14. One face of the second end plate 22 contacts the laminate assembly 14. An opposing face of the second end plate 22 establishes the second enclosed volume 38 together with the second housing 34. The second enclosed volume 38 is adjacent a second end portion 40 of the laminate assembly 14.

The laminate assembly 14 includes a plurality of laminations 42. The laminations 42 establish internal cavities within the laminate assembly 14 as is known. The laminations 42 are movable between sealed positions and unsealed positions relative to each other. In this example, the sealed positions permit less leakage of fluid from the laminate assembly 14 than the unsealed positions. The sealed positions also permit less leakage of fluid between the internal cavites of the laminate assembly 14 than the unsealed positions. The pressure within the internal cavities of the laminate assembly 14 is represented by $P_i$ in this example.

A first group of tie rods 46 secure the first end plate 18 relative to the second end plate 22. The example first group of tie rods 46 is secured to the housing 34. In this example, the tie rods within the first group of tie rods 46 include threaded portions 50 that are configured to engage nuts to secure the first end plate 18 relative to the second end plate 22. Tightening the nuts onto the threaded portions 50 of the first group of tie rods 46 urges the first end plate 18 toward the second end plate 22, which compresses the laminate assembly 14 and moves the laminations 42 to sealed positions relative to each other. The example first end plate 18 moves relative to the second end plate 22 as the first group of tie rods 46 is tightened. In this example, the laminate assembly 14 is preloaded by tightening the first group of tie rods 46. Although the first group of tie rods 46 and the second group of tie rods 54 are shown as tie rods in this example, other examples include using bolts, clamps, etc., in place of, or in addition to, the tie rods.

A second group of tie rods 54 engage the first housing 26 and the second housing 34. Notably, the first group of tie rods 46 is separate from the second group of tie rods 54. That is, the first group of tie rods 46 includes different tie rods and is configured to connect to different components than the second group of tie rods 54.

In this example, the tie rods within the second group of tie rods 54 include threaded portions 58 that are configured to engage nuts to secure the first housing 26 relative to the second housing 34. Tightening the nuts onto the threaded portions 58 urges the first housing 26 toward the second housing 34. The second group of tie rods 54 is lightly preloaded to load all the tie rods within the second group of tie rods 54 in this example.

The example laminate assembly 14 has a generally circular cross-section and establishes multiple apertures 62 radially positioned near the outer radial edge of the laminate assembly. Each of the apertures 62 are configured to receive one of the tie rods from the first group of tie rods 46 or the second group of tie rods 54.

The first end plate 18 and the second end plate 22 include apertures 66 configured to receive a tie rod from the second group of tie rods 54. The apertures 66 are sized such that the tie rod from the second group of tie rods 54 is free to move relative to the end plates 18 and 22 as the tie rods in the first group of tie rods 46 are tightened to the first end plate 18, the second end plate 22, or both.

The example first housing 26 includes a channel 70, or hole, that permits movement of the first group of tie rods 46 as the first group of tie rods 46 is tightened or moves relative to the first housing 26.

Dynamic seals 74 are positioned between the first end plate 18 and the first housing 26 to facilitate holding fluid within the first enclosed volume 30. A static seal 78 is positioned between the second end plate 22 and the second housing 34 to facilitate holding fluid within the second enclosed volume 38. Spring energized dynamic seals 74 and static seals 78 are shown. Other example seals include a bellows, a diaphragm, or a reinforced O-ring seal.

As can be appreciated from the figures, the example first housing 26 and the example second housing 34 are dome shaped. The first enclosed volume 30 and the second enclosed volume 38 have a generally hemispherical shape. Notably, the enclosed volumes 30 and 38 are disposed at the ends of the laminate assembly 14 and do not encircle the laminate assembly 14. In the disclosed examples, two domes are used. In another example, only one dome (or only the first housing 26) is used.

In this example, the pressure of the first enclosed volume 30 and the second enclosed volume 38 is represented by $P_e$. After the laminate assembly 14 is preloaded by tightening the first group of tie rods 46, $P_e$ is increased to oppose movement of the first end plate 18 away from the laminate assembly 14. The pressure $P_e$ effectively neutralizes the pressure $P_i$ such that the first group of tie rods 46 does not respond to the pressure $P_i$. The second group of tie rods 54 instead carries the pressure load associate with pressurizing the laminate assembly 14. The first group of tie rods 46 is thus sized to accommodate the preload, and the second group of tie rods 54 is sized to accommodate the pressures $P_i$ and $P_e$.

Fluid is introduced to the laminate assembly 14 through a plurality of fluid feed ports 82. The fluid feed ports 82 are axially extending in this example. In another example the fluid feed ports 82 are radially extending.

In one example the fluid is water, which the electrolyzer 10 breaks down into hydrogen and oxygen. The example electrolyzer 10 includes a controller 86 configured to control fluid flow from a fluid supply 90 to the laminate assembly 14. The controller 86 controls $P_i$ by controlling the fluid supply 90. Introducing fluid to the laminate assembly 14 pressurizes the internal cavities of the laminate assembly 14 and increases $P_i$. In this example, $P_e$ limits movement of the laminations 42 toward unsealed positions. Limiting this movement maintains the sealed relationship of the laminations 42 within the laminate assembly 14. In the prior art, increasing $P_i$ moved the laminations 42 toward unsealed positions.

A controller 94 is configured to control fluid flow from a fluid supply 98 to the first enclosed volume 30 and the second enclosed volume 38. The example fluid is nitrogen, and the controller 86 controls $P_e$ by controlling the flow of nitrogen to the first enclosed volume 30. A person having skill in this art and having the benefit of this disclosure would understand how to pressurize the first enclosed volume 30 and the second enclosed volume 38 using the fluid supply 98 and the controller 94 by incorporating a suitable valve arrangement into the electrolyzer 10, for example.

In one example, the first enclosed volume 30, the enclosed volume 38, and the internal cavities within the laminate assembly 14 are fluidly coupled. That is, increasing the pressure $P_i$ directly increases the pressure $P_e$. Such an example includes pressurizing the laminate assembly 14, the first enclosed volume 30 and the second enclosed volume 38 with the same fluid. Such an example may not require the fluid supply 98. Other examples include using the hydrogen from the electrolyzer process to increase the pressure $P_e$. Typically one of the fluids in the laminate assembly 14 is used to pressurize the enclosed volume 30 and the enclosed volume 38

Figure 3:
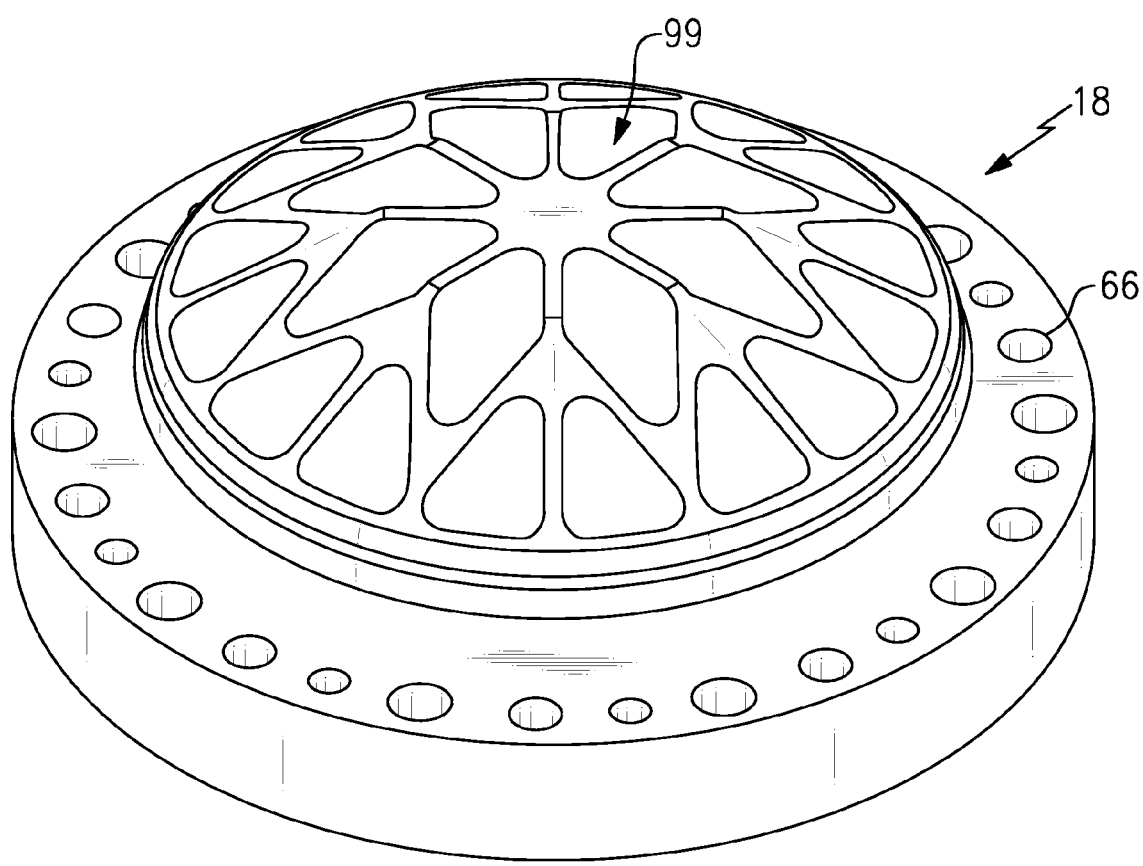
FIG. 3 shows a perspective view of an example end plate from the FIG. 1 electrolyzer.

Referring to FIG. 3, the first end plate 18 includes a plurality of apertures 99 that extend longitudinally nearly through the first end plate 18. Incorporating the plurality of apertures 99 reduces the overall weight of the first end plate 18 while maintaining the strength of the first end plate 18. The first end plate 18 comprises a material stiff enough to facilitate uniform compression of the laminate assembly 14.

Figure 4:
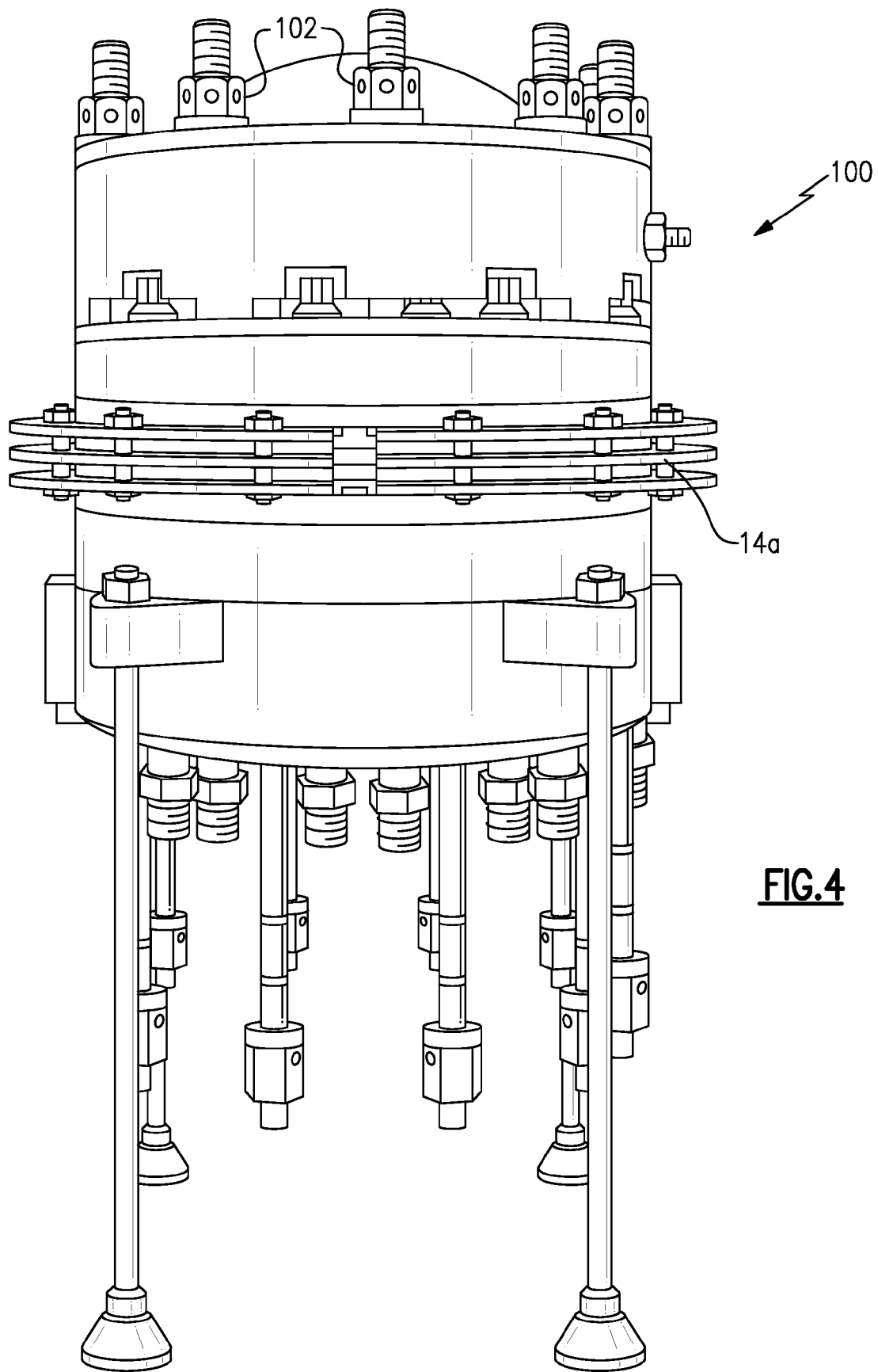
FIG. 4 shows a perspective view of another example electrolyzer having a laminate assembly.

Referring to FIG. 4, another example electrolyzer 100 includes a plurality of cells, each having laminate assemblies 14a. A plurality of nuts 102 secure the threaded portions 58 for the second group of tie rods 54.

Features of the disclosed examples include maintaining a sealing relationship between adjacent laminations with reduced structure and complexity. Another feature of the disclosed example is the use of two independent groupings of tie rods. One group is for preloading the laminate assembly, and the other group is for responding to pressurization of the laminate assembly. Yet another feature is the use of a dynamic seal between the dome and the first end plate. The dynamic seal facilitates the transmission of pressure load through the first end plate to the laminate assembly. Yet another feature of the disclosed example is a relatively lightweight and low volume active compression system that is independent from the preload system. For example, the first end plate and the second end plate can be lightweight because the only substantial force acting on them is the preload force.

Although a preferred embodiment has been disclosed, a worker of ordinary skill in this art would recognize that certain modifications would come within the scope of this invention. For that reason, the following claims should be studied to determine the true scope and content of this invention.

We claim:

1. A method of sealing a laminate assembly comprising:
preloading a laminate assembly having a plurality of laminations with a first tie rod arrangement, the first tie rod arrangement extends through a channel in a housing and moves freely through the channel in an axial direction relative to the housing, wherein the first tie rod arrangement is mechanically separated from the housing;

pressurizing the laminate assembly; and
pressurizing an enclosed volume disposed adjacent an end portion of the laminate assembly to hold the laminations in sealed positions, wherein the enclosed volume is partially defined by the housing.

2. The method of claim 1 wherein the preloading comprises urging the laminations toward sealed positions using the first tie rod arrangement.

3. The method of claim 1 comprising pressurizing the enclosed volume with a first pressure that is not less than the pressure within the laminate assembly.

4. The method of claim 1 wherein the laminate assembly is disposed between opposing endplates, one of the opposing endplates establishing a portion of the enclosed volume.

5. The method of claim 4 wherein one of the opposing endplates supports the laminate assembly and the other of the opposing endplates establishes the portion of the enclosed volume.

6. The method of claim 4 wherein the surface area of an enclosed volume side of the endplate is the same or greater than the surface area of a laminate side of the endplate.

7. The method of claim 1 including moving fluid into the enclosed volume to pressurize the enclosed volume.

8. The method of claim 7 wherein the enclosed volume is in fluid communication with the laminate assembly such that the pressure of the enclosed volume equalizes with the pressure within the laminate assembly.

9. The method of claim 1 wherein the pressure in the enclosed volume is greater than the pressure in the laminate assembly.

10. The method of claim 1 wherein the enclosed volume is defined by the housing and an endplate.

11. The method of claim 1 wherein the first tie rod arrangement does not secure the housing relative to the laminate assembly.

12. The method of claim 1 wherein the laminate assembly is pressurized with water and the enclosed volume is pressurized with nitrogen.

13. A method of claim 1 wherein the laminate assembly is fluidly separated from the enclosed volume.

14. The method of claim 13 wherein the laminate assembly is pressurized with a first fluid and the enclosed volume is pressurized with a different second fluid.

15. The method of claim 1 wherein first tie rod arrangement includes a first tie rod, the first tie rod includes a first distal end and a second opposite distal end, one of the first distal end and second distal end terminates within the channel.

16. The method of claim 1 wherein the first tie rod arrangement moves through the channel without engaging the housing.

17. A method of sealing a laminate assembly comprising:
preloading a laminate assembly including a plurality of laminations with a first tie rod arrangement, the laminate assembly is disposed between opposing endplates, one of the opposing endplates supports the laminate assembly and the other of the opposing endplates establishes a portion of an enclosed volume, the first tie rod arrangement secured to at least one of the opposing endplates, wherein the first tie rod arrangement extends a first length and the second tie rod arrangement extends a second length, the second length greater than the first length;
using a second tie rod arrangement different from the first tie rod arrangement to hold a housing relative to the laminate assembly, the housing establishing the enclosed volume with one of the opposing endplates;
pressurizing the laminate assembly; and
pressurizing the enclosed volume disposed adjacent an end portion of the laminate assembly to hold the laminations in sealed positions.

18. The method of claim 17 wherein the first tie rod arrangement comprises more than one tie rod, and the second tie rod arrangement comprises more than one tie rod.

19. The method of claim 17 wherein the first tie rod arrangement and the second tie rod arrangement are received within apertures established in the laminate assembly.

20. The method of claim 17 wherein the first tie rod arrangement extends through a channel in the housing and moves freely through the channel in an axial direction without engaging the housing.

21. The method of claim 17 wherein the first tie rod arrangement engages each of the opposing endplates.

22. A method of sealing a laminate assembly comprising:
preloading a laminate assembly having a plurality of laminations;
pressurizing the laminate assembly; and
pressurizing a first enclosed volume disposed adjacent a first end portion of the laminate assembly and a second enclosed volume disposed adjacent a second end portion of the laminate assembly to hold the laminations in sealed positions, using a first tie rod arrangement to hold the second enclosed volume relative to the laminate assembly, using a second tie rod arrangement to hold the first enclosed volume relative to the laminate assembly, wherein the first tie rod arrangement only holds the first enclosed volume relative to the laminate assembly.

23. The method of claim 22 wherein the first enclosed volume is defined by a first endplate and a first housing and the second enclosed volume is defined by a second endplate and a second housing, the first tie rod arrangement holding the first end plate, the laminate assembly, the second endplate, and the second housing, the second tie rod arrangement holding the first housing, the first end plate, the laminate assembly, the second endplate, and the second housing, wherein the first housing is held by the second tie rod arrangement and not the first tie rod arrangement.

24. A method of sealing a laminate assembly comprising:
preloading a laminate assembly having a plurality of laminations with a first tie rod arrangement movable relative to a housing wherein the first tie rod arrangement is mechanically separated from the housing;
pressurizing the laminate assembly; and
pressurizing an enclosed volume disposed adjacent an end portion of the laminate assembly to hold the laminations in sealed positions, wherein the enclosed volume is partially defined by the housing.

* * * * *